(12) United States Patent
Tanaka et al.

(10) Patent No.: US 8,499,934 B2
(45) Date of Patent: Aug. 6, 2013

(54) PACKAGE STRUCTURE WITH A FLAT DISPLAY UNIT PACKED THEREIN AND PACKAGE STRUCTURE FOR PACKING A FLAT DISPLAY UNIT

(75) Inventors: Teppei Tanaka, Yokohama (JP); Yutaka Yamada, Yokohama (JP); Shuji Kato, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 153 days.

(21) Appl. No.: 12/912,803

(22) Filed: Oct. 27, 2010

(65) Prior Publication Data

US 2011/0210024 A1    Sep. 1, 2011

(30) Foreign Application Priority Data

Feb. 26, 2010 (JP) ................... 2010-041284

(51) Int. Cl.
*B65D 85/00* (2006.01)
(52) U.S. Cl.
USPC ............................ 206/320; 206/453; 206/521
(58) Field of Classification Search
USPC ................ 206/320, 453, 521, 576, 591–594, 206/701
See application file for complete search history.

(56) References Cited

U.S. PATENT DOCUMENTS

| 3,938,661 | A | * | 2/1976 | Carmody | 206/523 |
| 6,105,765 | A | * | 8/2000 | Chu | 206/320 |
| RE37,253 | E | * | 7/2001 | Moren et al. | 206/586 |
| 6,382,422 | B1 | * | 5/2002 | Bocek | 206/586 |
| 6,915,905 | B2 | * | 7/2005 | Yoshimura | 206/586 |
| 7,303,071 | B2 | * | 12/2007 | Saito | 206/320 |
| 7,341,152 | B2 | * | 3/2008 | Yoshimura | 206/521 |
| 8,028,831 | B2 | * | 10/2011 | Kakuta et al. | 206/320 |
| 2008/0067096 | A1 | | 3/2008 | Maruta | |

FOREIGN PATENT DOCUMENTS

| EP | 1 902 962 | 3/2008 |
| JP | 07-242233 | 9/1995 |
| JP | 09-095361 | 4/1997 |
| JP | 2577104 | 5/1998 |
| JP | 2007-084142 | 4/2007 |
| JP | 2008-74416 | 4/2008 |
| JP | 2008-074416 | 4/2008 |
| JP | 2008-222257 | 9/2008 |
| JP | 2009-262941 | 11/2009 |
| WO | WO 2007/013319 | 2/2007 |

* cited by examiner

*Primary Examiner* — Andrew Perreault
(74) *Attorney, Agent, or Firm* — Antonelli, Terry, Stout & Kraus, LLP.

(57) ABSTRACT

There is provided a package structure for packing a flat display unit which improves workability in taking a flat display unit out of a packing box. A lower cushioning material which supports a display portion of the flat display unit from below has a manual insertion portion so that the display portion can be held at a portion close to a lifting person's body when the display portion is taken out of a lower part of the packing box. A reinforcing rib is provided on a front side of the lower cushioning material to prevent damage to the lower cushioning material due to a reduction in strength. To prevent the lower cushioning material from being taken out together with the display portion when the display portion is taken out, a recess is provided in the lower cushioning material so that the recess is caught on a bending portion in the lower part when the display portion is taken out.

16 Claims, 7 Drawing Sheets

PACKAGE STRUCTURE WITH A FLAT DISPLAY UNIT PACKED THEREIN AND PACKAGE STRUCTURE FOR PACKING A FLAT DISPLAY UNIT

INCORPORATION BY REFERENCE

The present application claims priority from Japanese application JP2010-041284 filed on Feb. 26, 2010, the content of which is hereby incorporated by reference into this application.

BACKGROUND OF THE INVENTION (1) Field of the Invention

The present invention relates to a package structure with a flat display unit packed therein which uses a liquid crystal display panel, a plasma display panel, or an organic EL display panel as an image display device, or a package structure for packing a flat display unit.

(2) Description of Related Art

Generally, a flat display unit such as a television receiver is packed in a packing box such as a corrugated box or a package including a cushioning member such as foamed styrol or the like (hereinafter sometimes referred to as "packing structure") and conveyed from a manufacturing plant to a dealer or a user. The packing structure has a function of reducing vibration, impact, or the like from outside in a transport process and protecting the flat display unit.

JP-A-2008-74416 and JP-A-2009-262941 propose a packing structure which packing therein a flat display unit and a stand removed from the flat display unit.

BRIEF SUMMARY OF THE INVENTION

In the packing structure described in JP-A-2008-74416 and JP-A-2009-262941, unpacking procedure is as follows: An upper packing box, an upper cushioning material, or the like are removed and the stand is taken out. Then, the flat display unit is lifted and assembled to the stand.

For JP-A-2008-74416, when taking the flat display unit out of a lower part of the packing box, for example, two persons place their hands on lower and upper sides of the flat display unit and lift the flat display unit. At this time, the persons hold the lower side at an inner portion without a lower cushioning material. Specifically, the lower side to be held is located apart from the lifting persons' bodies by the size of the lower cushioning material, and it is difficult to lift the flat display unit. It is supposed that the persons hold side surfaces of the flat display unit for lifting, but this case requires a considerably strong grip, and lifting requires much labor.

For JP-A-2009-262941, a lower part of the packing has a large height, and the flat display unit needs to be lifted higher than the lower part of the packing box. Thus, it is difficult to take out a large and heavy flat display unit.

The present invention is achieved in view of the above-described problems of the conventional techniques, and provides a package structure for packing a flat display unit having a technique suitable for improving workability in unpacking.

The present invention has features described in Claims. More specifically, a lower cushioning material has a manual insertion portion so that a lifting person can hold a lower side of a flat display unit at a portion close to the person's body. To prevent separation or break due to a reduction in strength at that time, a reinforcing front rib is provided on a front side of the lower cushioning material. Also, to prevent the lower cushioning material from being caught on a hand and being taken out together with the flat display unit when the flat display unit is taken out, a packing structure is provided in which the lower cushioning material has a recess and a lower packing box has a bending portion.

According to the present invention, the flat display unit can be easily taken out of the package, and workability in unpacking can be improved.

Other objects, features and advantages of the invention will become apparent from the following description of the embodiments of the invention taken in conjunction with the accompanying drawings.

BRIEF DESCRIPTION OF THE DRAWING

The invention will now be described with reference to the drawing wherein.

DETAILED DESCRIPTION OF THE INVENTION

Figure 1:
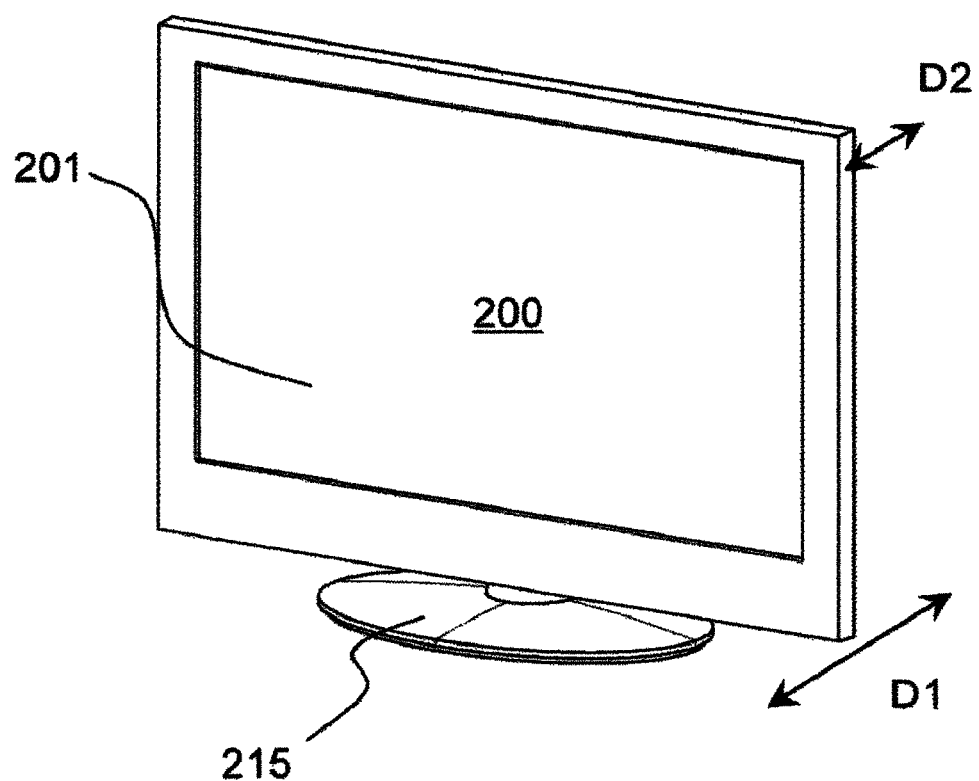
FIG. 1 is a perspective view of a flat display unit.

Now, an embodiment of the present invention will be described with reference to the drawings. In the drawings, components having a common function are denoted by the same reference numerals, and overlapping descriptions will be omitted.

First, a configuration of a flat display unit which is an object to be packed will be described.

FIG. 1 is a perspective view of a flat display unit. The flat display unit 200 includes a display portion 201 and a stand mechanism 215. The display portion 201 may be, for example, a liquid crystal display, a plasma display, an organic EL display, or the like. As shown in FIG. 1, the stand mechanism 215 is mounted to a lower portion of the display portion 201, so that the display portion 201 can stand upright.

To maintain the display portion 201 in the standing state as shown in FIG. 1 and prevent the display portion 201 from easily falling down, a depth D1 of the stand mechanism 215 needs to be relatively large, and is larger than a depth D2 of the display portion 201. For example, for a 50-inch flat display unit, a depth D2 of a display portion 201 is about 10 cm, while a depth D1 of a stand mechanism 215 is about 30 to 35 cm.

When the display portion 201 and the stand mechanism 215 mounted to the display portion 201 are packed into the packing box and transported, the packing box needs to have a size larger than the depth D1 of the stand mechanism 215, which reduces transport efficiency and requires a large space for storage or the like. Thus, for a packing structure for the flat display unit according to the embodiment of the present invention, the display portion 201 and the stand mechanism 215 are packed with the stand mechanism 215 being removed from the display portion 201 as is conventional, thereby reducing a volume of a packing box and improving transport efficiency. A packing method will be described later.

Figure 2A:
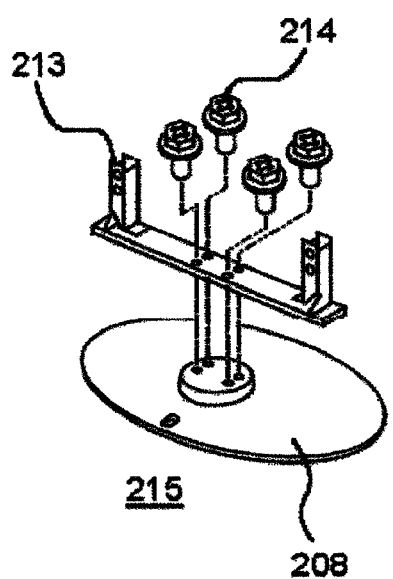
FIG. 2A is a perspective view showing assembling of the stand mechanism.
Figure 2B:
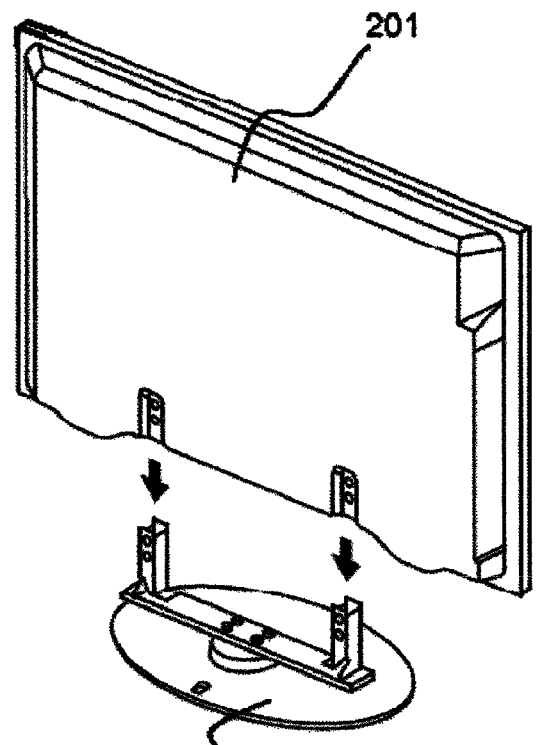
FIG. 2B is a perspective view showing assembling of the flat display unit.
Figure 2C:
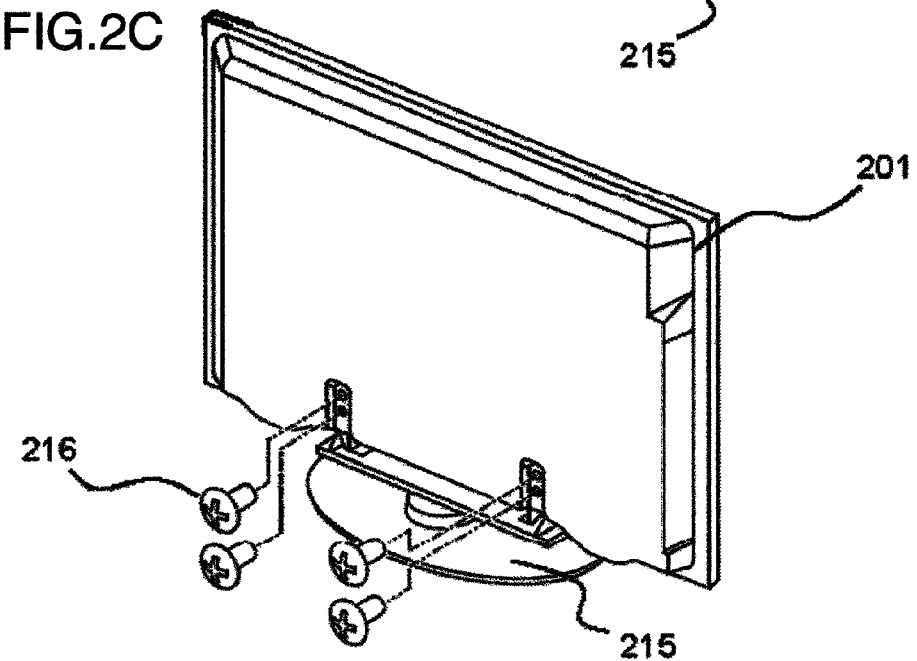
FIG. 2C is a perspective view showing assembling of the stand mechanism.

FIGS. 2A to 2C show an assembling view of the flat display unit. FIG. 2A is an assembling view of the stand mechanism 215. FIG. 2B is an assembling view of the flat display unit 210, and FIG. 2C is an assembling view of the stand mechanism 215. As shown in FIG. 2A, the stand mechanism 215 includes a stand 208 in contact with a floor surface, and a display portion-holding member 213 which supports the display portion 201 from below to connect the display portion 201 and the stand 208. The display portion-holding member 213 and the stand 208 are fixedly held by a mounting screw 214. As shown in FIG. 2B, the display portion 201 is inserted from above into the display portion-holding member 213 of the stand mechanism 215 and mounted, and fixedly held by display portion-securing screws 216 as shown in FIG. 2C.

Next, the packing structure for packing the flat display unit therein will be described in detail.

Figure 3A:
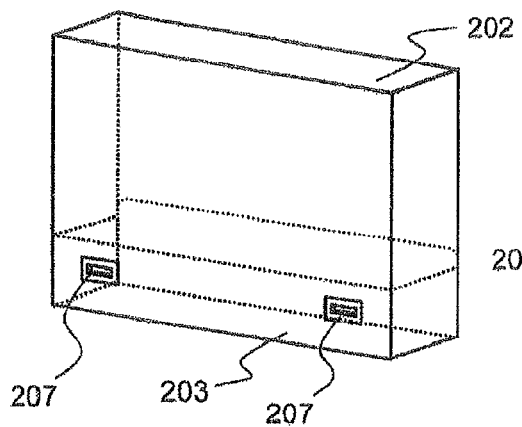
FIG. 3A is a perspective view showing an appearance of the packing structure for packing the flat display unit.
Figure 3C:
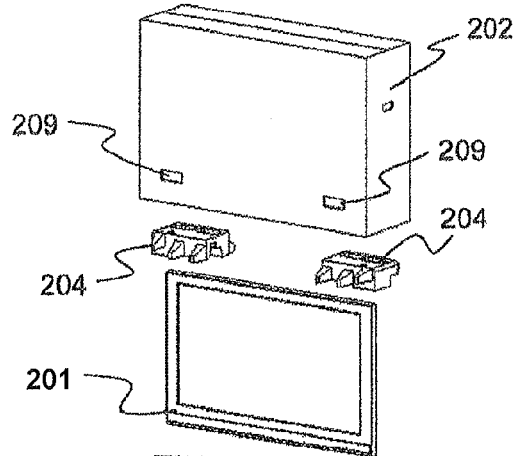
FIG. 3C is an exploded perspective view showing the entire packing structure.
Figure 3B:
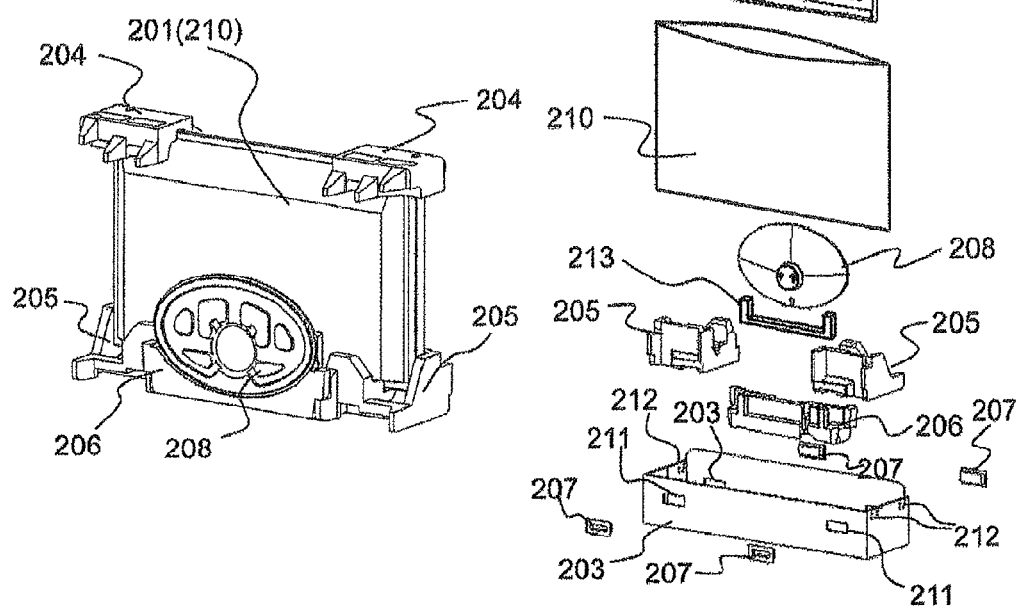
FIG. 3B is a perspective view showing an inside of a packing box.

FIGS. 3A to 3C illustrate the packing structure for packing the flat display unit. FIG. 3A is a perspective view showing an appearance of the packing structure of the flat display unit. FIG. 3B is a perspective view showing an inside of a packing box. FIG. 3C is a perspective exploded view showing the entire packing structure.

The packing box includes an upper part 202 and a lower part 203. The upper part 202 and the lower part 203 have an upper connection hole 209 and a lower connection hole 211, respectively. Positions of the upper connection hole 209 and the lower connection hole 211 in the upper part 202 and the lower part 203 are set so that the upper connection hole 209 is aligned with the lower connection hole 211 when the upper part 202 is placed over and assembled to the lower part 203. Then, the upper part 202 is placed over the lower part 203 to align the upper connection hole 209 with the lower connection hole 211, and a resin connecting member 207 is inserted into the upper connection hole 209 and the lower connection hole 211 with a protrusion being oriented inward of the packing box to connect the upper part 202 and the lower part 203.

Further, the connecting member 207 has an opening oriented outward of the packing box and into which a hand can be inserted. Specifically, the connecting member 207 also serves as a grip in holding the packing box, and the hand is placed on the connecting member 207 when the packing box is lifted.

The display portion 201 is covered with a protective inner bag 210 such as a polyethylene film so as to prevent damage to a screen or a casing of the display portion 201. The display portion 201 covered with the inner bag 210 is placed in the packing box 203, and held by a cushioning material. In this embodiment, an upper cushioning member 204 and a lower cushioning material 205 formed of foamed styrol or the like are used as cushioning materials. As shown, two upper cushioning members 204 and two lower cushioning materials 205 are placed in positions corresponding to four corners of the display portion 201 in the packing box 203. The two upper cushioning members 204 are placed on a side of the upper part 202, and hold upper left and right ends of the display portion 201 from above, respectively. Meanwhile, the two lower cushioning members 205 are placed on a bottom surface of the lower part 203, and support lower left and right ends of the display portion 201 from below, respectively. As such, the upper cushioning member 204 and the lower cushioning material 205 are provided between the display portion 201 and the upper and lower parts 202 and 203, and thus absorb vibration, impact, or the like from outside and prevent the vibration, the impact, or the like from being transferred to the display portion 201, thereby preventing damage to the display portion 201.

As described above, to reduce a volume of the packing box, the stand mechanism 215 and the display portion 201 are packed without the stand mechanism 215 being mounted to the display portion 201. As shown in FIG. 3B or 3C, with the stand mechanism 215 being separated into the stand 208 and the display portion-holding member 213, the stand mechanism 215 is packed in a rear portion of the display portion 201 using a stand cushioning material 206. In the lower part 203, bending portions 212 which can be bent inward of the packing box are provided on a front side (back side of a sheet surface) of left and right side surfaces so that the front side bending portions 212 in a bent state can abut against the lower cushioning material 205. This prevents the lower cushioning material 205 from being lifted together with the display portion 201 when the display portion 201 is lifted and drawn from the lower part 203. Details of the front side bending portion 212 will be described later.

Figure 4A:
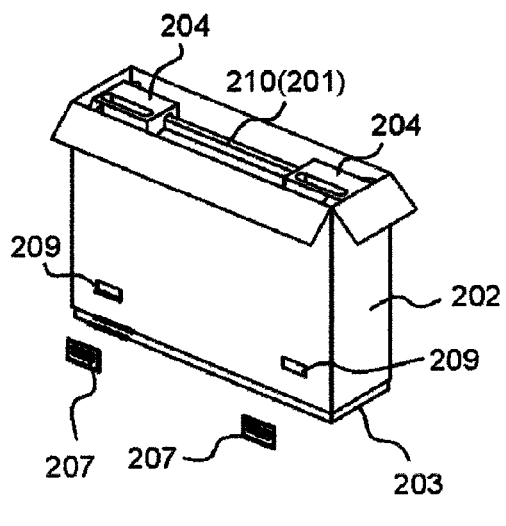
FIG. 4A is a perspective view showing unpacking of the packing structure according to an embodiment in which the an upper cushioning material is taken out of the upper part.
Figure 4C:
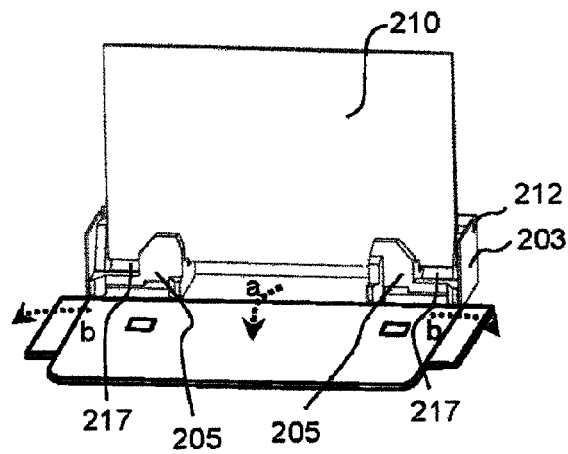
FIG. 4C is a perspective view showing unpacking of the packing structure according to the embodiment in which the lower part is developed.
Figure 4B:
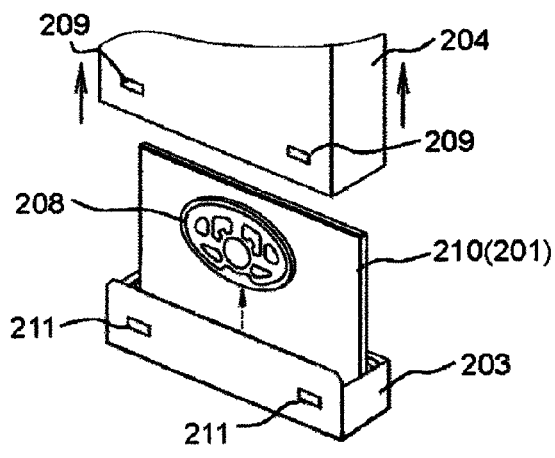
FIG. 4B is a perspective view showing unpacking of the packing structure according to the embodiment in which the upper part is lifted upward and removed from the lower part.

FIGS. 4A to 4D illustrate unpacking of the packing structure according to this embodiment. As shown in FIG. 4A, an upper portion of the upper part 202 is opened, and the upper cushioning material 204 is taken out of the upper part 202. Then, the connecting member 207 (grip) connecting the upper part 202 and the lower part 203 is removed, and as shown in FIG. 4B, the upper part 202 is lifted upward and removed from the lower part 203. After the upper part 202 is removed, the stand cushioning material 206, the display portion-holding member 213, and the stand 208 are taken out of the lower part 203. Only the stand 208 is herein shown for simplicity. Then, the display portion-holding member 213 and the stand 208 are assembled as in FIG. 2A to form the stand mechanism 215.

Figure 4D:
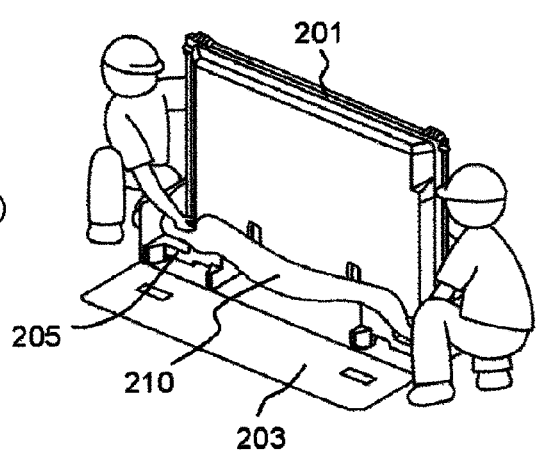
FIG. 4D is a perspective view showing unpacking of the packing structure according to the embodiment in which left and right ends of the display portion are gripped by inserting human hands into gaps.

Next, as shown in FIG. 4C, a bending portion 212 on a rear side is removed. Then, the lower part 203 is developed firstly as indicated by an arrow a, and secondly as indicated by arrow b. As shown in FIG. 4D, the inner bag 210 protecting the display portion 201 is pushed down to the lower cushioning material 205, and hands are inserted from inside the inner bag 210 into manual insertion portions or gaps 217 (see FIG. 4C)

formed in the lower cushioning material 205 to grip left and right ends of the display portion 201. Then, the display portion 201 is lifted and assembled to the stand mechanism 215 having assembled before by a method shown in FIGS. 2B and 2C.

As described above, in the packing structure according to this embodiment, the lower cushioning material 205 includes the manual insertion portions 217 so that hands can be inserted into the lower left and right ends of the display portion 201 to allow the hands to be inserted into the lower left and right ends of the display portion 201. The hands are inserted into the lower left and right ends, and thus a lifting person can hold the lower side of the display portion 201 at a portion close to the person's body. Thus, even a large display portion 201 can be easily taken out of the lower part 203.

If the lower left and right ends of the display portion 201 are gripped from the front side, the screen of the display portion 201 may be damaged. Thus, the manual insertion portions 217 are provided in the lower cushioning material 205 on the rear side of the display portion 201. This allows the display portion 201 to be lifted so that the screen (front surface) of the display portion 201 is not touched as much as possible.

Further, when the display portion 201 is inserted into the stand mechanism 215 during installation, it is necessary to confirm from the rear side of the display portion 201 that the display portion 201 is inserted into the stand mechanism 215 so as to prevent improper insertion or prevent the stand mechanism 215 from being accidentally brought into contact with and damaging the display portion 201.

Thus, in this embodiment, the manual insertion portions 217 are provided on the rear side of the lower cushioning material 205 as described above, and thus the hands gripping the display portion 201 from the rear side can be placed on the lower side. For example, as shown, a right person in FIG. 4D grips a lower right end of the display portion 201 from the rear side of the display portion 201 by the left hand and an upper right end of the display portion 201 by the right hand. Specifically, for the right person, the hand (right hand) gripping the display portion 201 from the rear side is placed on the lower side of the display portion 201, and thus the right person naturally sees the rear side of the display portion 201 when lifting the display portion 201, and the right person can lift the display portion 201 while looking at the rear side of the display portion 201. The same applies to the left person. On the contrary, when the hand (right hand of the right person) gripping the display portion 201 from the rear side is placed on the upper side, the hand holding the upper side gets in the way to make it difficult to confirm a portion to be inserted into the stand mechanism 215 on the rear side.

As such, in this embodiment, the manual insertion portions 217 are provided on the rear side of the lower cushioning material 205 to make it easy to confirm the rear side of the display portion 201 when lifting the display portion 201, thereby improving workability in insertion into the stand mechanism 215.

FIGS. 5A to 5D show a specific example of the lower cushioning material 205 which is a feature of this embodiment.

Figure 5A:
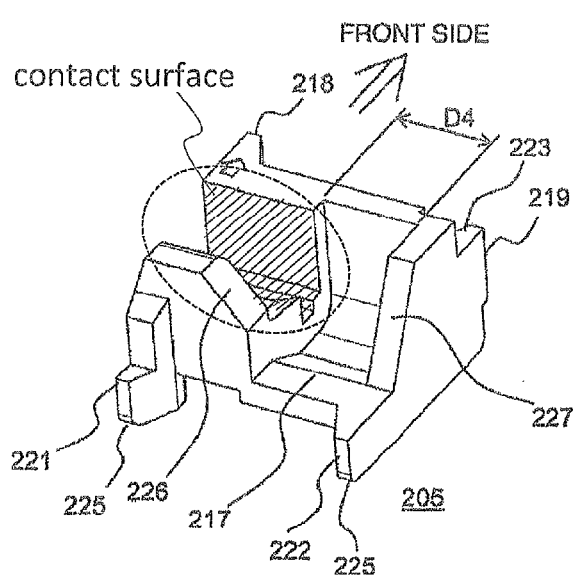
FIG. 5A is a rear perspective view showing an example of the lower cushioning material of the embodiment.
Figure 5B:
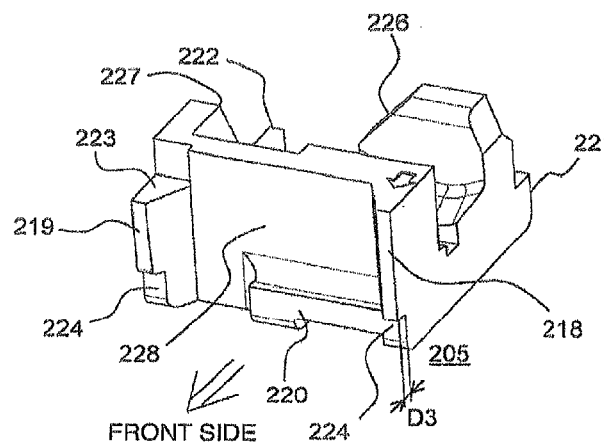
FIG. 5B is a front perspective view showing an example of the lower cushioning material of the embodiment.

When the display portion 201 in a packed state falls down or is subjected to vibration or the like from outside, the display portion 201 is subjected to an impact from the front side or the rear side. To reduce such an impact, the lower cushioning material 205 in this embodiment has, as shown in FIGS. 5A and 5B, a front rib A218 and a front rib B219 protruding on the front side at the left and right ends on the front side (back side of the sheet surface), and a rear rib A221 and a rear rib B222 protruding on the rear side at the left and right ends on the rear side (front side of the sheet surface). When the ribs are housed in the packing box, the front rib A218 and the front rib B219 abut against an inner surface on the front side of the lower part 203, and the rear rib A221 and the rear rib B222 abut against an inner surface on the rear side of the lower part 203. The ribs have a function of reducing the impact from the front side and the rear side on surfaces in contact with the lower part 203, and protecting the display portion 201. The front rib A218 and the front rib B219, and the rear rib A221 and the rear rib B222 are provided on areas other than a region (width D4 in FIG. 5A) in which the manual insertion portion 217 described later is provided (or provided to slightly overlap the region). This can prevent a load to each rib from being mainly transferred to a portion formed with the manual insertion portion 217.

Figure 5C:
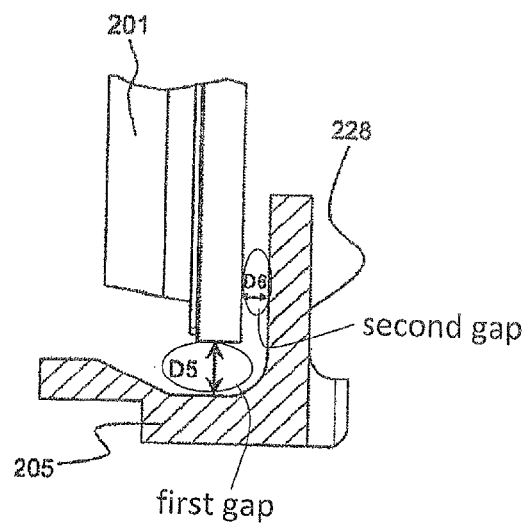
FIG. 5C is a section view showing an example of the lower cushioning material of the embodiment.
Figure 5D:
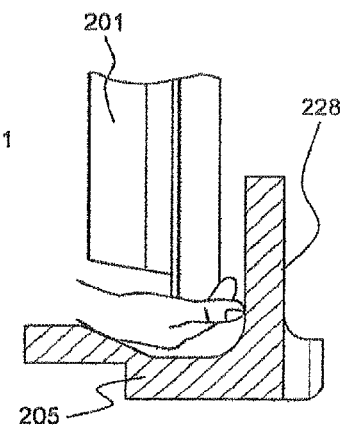
FIG. 5D is a section view showing an example of the lower cushioning material of the embodiment.

As described above, the lower cushioning material 205 has the manual insertion portion 217 which is a gap having such a size that a user can insert the hand therein. The gap, that is, the manual insertion portion 217 is provided under each of the lower left and right ends of the display portion 201 in packing. As shown in FIG. 5A, to safely grip the display portion 201, the manual insertion portion 217 has a width D4 of about 10 to about 11 cm, which is a horizontal (lateral) size when viewed from the front surface or the rear surface. As shown in a lateral sectional view of the lower cushioning material 205 in FIG. 5C, with the display portion 201 being placed on the lower cushioning material 205, a gap D5 which is a distance between the lower end of the display portion 201 and the bottom surface of the manual insertion portion 217 of the lower cushioning material 205 is preferably about 3 to about 4 cm. As shown in FIGS. 5C and 5D, fingers also need to be inserted between the front surface of the display portion 201 and the surface of the lower cushioning material 205 facing the front surface of the display portion 201, and thus a gap D6 between the front surface of the display portion 201 and the surface of the lower cushioning material 205 facing the front surface of the display portion 201 is preferably about 1.5 to about 3 cm. Thus, as shown in FIG. 5D, the hand can be easily inserted from the lower end of the display portion 201 to grip the lower end of the display portion 201, and the display portion 201 can be safely gripped and taken out.

The manual insertion portion 217, as described above, needs to have such a size that a human's hand can be inserted therein, and thus a relatively large gap (space) for insertion of the hand is required relative to the size of the lower cushioning material 205. In particular, for the display portion 201 to be reliably held by the hand, as shown in FIG. 5D, it is necessary that the hand can be inserted from the rear side to the front side of the lower portion of the display portion 201. This reduces a thickness on the front side of the lower cushioning material 205 and reduces mechanical strength of the portion. If the strength of the lower cushioning material 205 is reduced, the lower cushioning material 205 may be cracked or damaged when vibration, impact, or the like is applied thereto from outside, which prevents the packed display portion 201 from being reliably protected. If the lower cushioning material 205 is damaged, the lower cushioning material 205 cannot be reused.

To prevent such a crack or damage, a reinforcing front rib C220 protruding on the front side is provided between the front rib A218 and the front rib B219 on the front side of the lower cushioning material 205. This increases strength on the front side of the lower cushioning material 205. Thus, even if the manual insertion portion 217 is provided to reduce the thickness of the lower cushioning material 205, a crack in or damage to the lower cushioning material 205 can be prevented to reliably protect the packed display portion 201.

Also, preventing the crack in or the damage to the lower cushioning material 205 allows the lower cushioning material 205 to be reused.

If the front rib C220 is directly subjected to an impact from the front surface, the front rib C220 may be broken to reduce the strength of the lower cushioning material 205. Thus, in this embodiment, a gap D3 in a depth direction is provided between a tip of the front rib C220 and tips of the front rib A218 and the front rib B219. Specifically, when the lower cushioning material 205 is viewed from above, a protrusion size of the front rib C220 on the front side is smaller than those of the front rib A218 and the front rib B219 so that the front rib C220 is not brought into contact with the inner surface of the lower part 203.

With such a configuration, when an impact is applied from the front surface, a force by the impact is mainly applied to the front rib A218 and the front rib B219 in contact with the inner surface of the lower part 203. The front rib A218 and the front rib B219 each has a fan shape with a width increasing from the front side toward the rear side when the lower cushioning material 205 is viewed from above so as to easily absorb the impact. Thus, the front rib C220 not in contact with the lower part 203 is not directly subjected to the impact, thereby preventing the front rib C220 from being broken by the impact from the front surface. The rear rib A221 and the rear rib B222 each also has a fan shape with a width increasing from the rear side toward the front surface when the lower cushioning member 205 is viewed from above.

When the packing box packing the display portion 201 falls down from a corner and an impact is applied from outside, tip corner portions of the front rib A218 and the front rib B219, and the rear rib A221 and the rear rib B222 in contact with the lower part 203 are subjected to the impact, and the ribs may be broken. To prevent this, crack preventing structures A224 and B225 are provided in the front rib A218 and the front rib B219, and the rear rib A221 and the rear rib B222. The crack preventing structure A224 and the crack preventing structure B225 are formed by cutting or rounding a corner portion of each rib corresponding to each corner portion of the packing box. Thus, the crack preventing structures A224 and B225 are provided to eliminate a portion in contact with the corner portion of the lower part 203. Thus, even if the packing box packing the display portion 210 falls down from the corner, the impact on the front rib A218 and the front rib B219, and the rear rib A221 and the rear rib B222 is reduced to prevent the front rib A218 and the front rib B219, and the rear rib A221 and the rear rib B222 from being broken by the impact. A recessed space surrounded by the front rib A218, the front rib B219, and the reinforcing front rib C220 is a placement space 228. The space is used as an insertion space of the connecting member 207, or various interior parts of the display unit (for example, a cable or a remote control) can be placed in the space.

As described above, when the user inserts the hand in the manual insertion portion 217, it is necessary to first push down the inner bag 210 covering the display portion 201 and place the hand between the inner bag 210 and the display portion 201. A sloping rear tapered portion 226 is provided on the rear side of the lower cushioning material 205 and on a middle side of the packing box of the manual insertion portion 217 so that the hand can be easily inserted between the inner bag 210 and the display portion 201. The rear tapered portion 226 is provided in the lower cushioning material 205, and thus the hand can be easily inserted when the inner bag 210 is pushed down, thereby improving workability. Also, a sloping side tapered portion 227 is provided on a lateral side of the lower cushioning material 205 (side wall of the lower cushioning material 205 adjacent to the manual insertion portion 217) so that the workers can easily grip the lower left and right ends of the display portion 201 with the hands being inserted from the lateral sides. The side tapered portion 227 is provided to allow the workers to easily grip the display portion 210 from the lateral side, thereby improving workability.

As shown in FIG. 5, a recess 223 is provided on the front side of the lower cushioning material 205 and at the corner portion in contact with the corner portion of the lower part 203, and abuts against the front side bending portion 212 as described above to prevent the lower cushioning material 205 from being lifted together with the display portion 201 when the display portion 201 is lifted and drawn from the lower part 203. Details thereof will be described later.

In FIG. 5, only the right lower cushioning material 205 which supports the lower right end of the display portion 201 from below is shown, but it goes without saying that the left lower cushioning material 205 has a structure symmetrical to the right lower cushioning material 205.

In this embodiment, the packing box has the structure in which the upper part 202 and the lower part 203 are connected by the connecting member 207, but may have a packing structure in which the upper part 202 and the lower part 203 are integrated without the connecting member 207. Also in this embodiment, the stand mechanism 215 is packed with the stand mechanism 215 being separated into the display portion-holding member 213 and the stand 208, but the stand mechanism 215 may be packed with the display portion-holding member 213 and the stand 208 being previously assembled as the stand mechanism 215. Further in this embodiment, the upper cushioning material 204 and the lower cushioning material 205 are formed of laterally separated parts, but the upper and lower cushioning materials each may be formed of a laterally integrated cushioning material.

Figure 6:
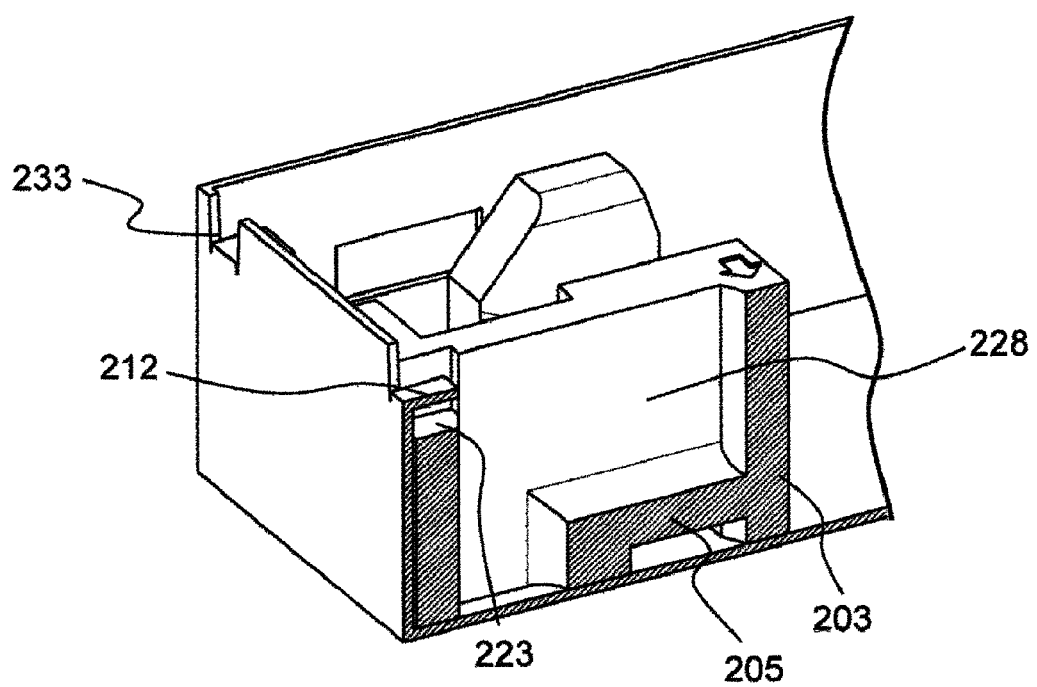
FIG. 6 is a sectional view of the lower cushioning material mounted to the lower part.

Next, the front side bending portion 212 will be described. FIG. 6 is a sectional view of a state where the lower cushioning material 205 is mounted to the lower part 203. When the display portion 201 is taken out of the lower part 203, the lower cushioning material 205 may be taken out together with the display portion 201 due to a friction force generated on the contact surface between the display portion 201 and the lower cushioning material 205 or if the lower cushioning material 205 is caught on the hand when the hand is inserted into the manual insertion portion 217 in the lower cushioning material 205 to take out the display portion 201. To prevent this, in this embodiment, as shown in FIG. 6, a taking-out preventing structure is provided in the lower part 203 and the lower cushioning material 205. The taking-out preventing structure includes the front side bending portion 212 provided in the side surface of the lower part 203, and the recess 223 provided on the front side of the lower cushioning material 205 and at the corner portion in contact with the corner portion of the lower part 203. When bent inward of the packing box, the front side bending portion 212 is placed in the space formed by the recess 223.

For such a taking-out preventing structure, if the display portion 201 is about to be taken out of the lower part 203, the front side bending portion 212 abuts against and is caught on the recess 223, and a force is applied to the bending portion 212 in a direction opposite to a direction of taking out the display portion 201 (that is, downward). Thus, when the display portion 201 is taken out, the lower cushioning material 205 is pressed down by the front side bending portion 212 to prevent the lower cushioning material 205 from being taken out together with the display portion 201. When the display portion 201 is taken out while being rotated, a friction force generated between the display portion 201 and the lower cushioning material 205 is larger in regions on the lateral sides than on the front side or the rear side. Thus, the front side bending portion 212 is preferably provided on the lateral side rather than the front side of the lower part 203.

A bending portion (rear side bending portion 233) is also provided on a rear side of the side surface of the lower part 203, and has a function of a connecting portion for maintaining a box shape of the lower part 203 together with the front side bending portion 212. Such a function will be described with reference to FIGS. 7A to 7B showing an assembling method of the lower part 203 of the packing box 202.

Figure 7A:
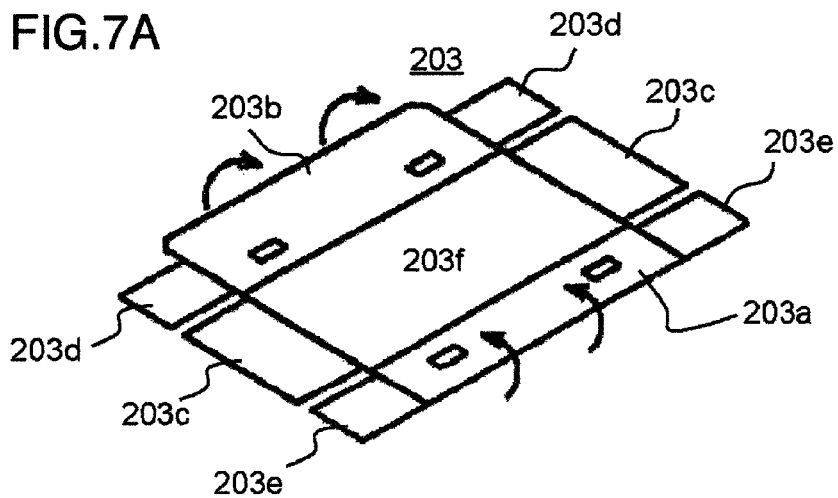
FIG. 7A is a perspective view showing a first step of assembling method of the lower part of the packing box.
Figure 7B:
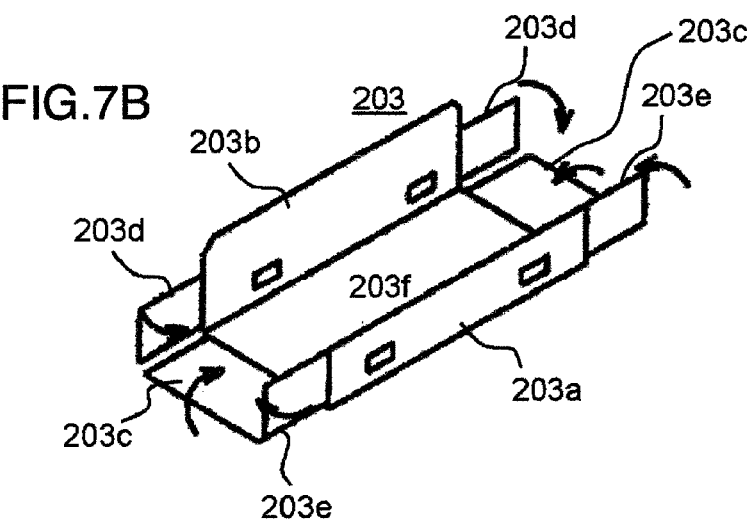
FIG. 7B is a perspective view showing a second step of assembling method of the lower part of the packing box.
Figure 7C:
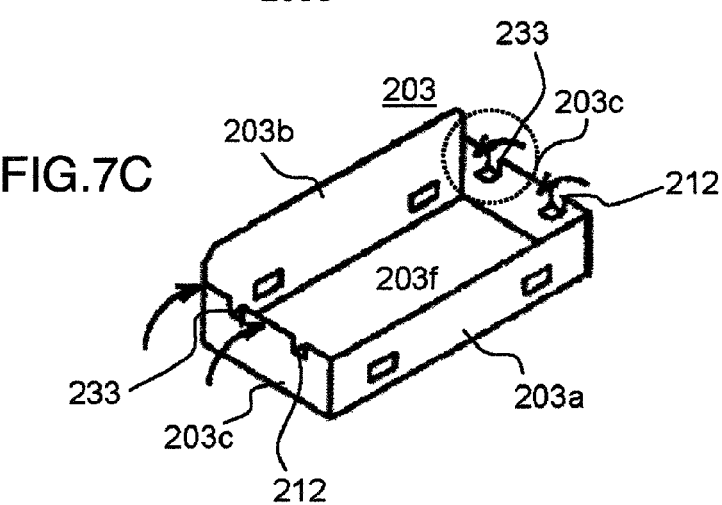
FIG. 7C is a perspective view showing a third step of assembling method of the lower part of the packing box.
Figure 7D:
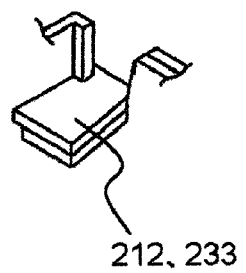
FIG. 7D is a perspective view showing a front side bending portion and the rear side bending portion of the lower part of the packing box.

When the lower part 203 is assembled in packing, as shown in FIG. 7A, a front portion 203*a* and a rear portion 203*b* of the lower part 203 are first bent inward perpendicularly to a bottom surface 203*f* of the lower part 203. Then, as shown in FIG. 7B, inner wall side portions 203*e* and 203*d* connected to the front portion 203*a* and the rear portion 203*b*, respectively are bent inward perpendicularly to the front portion 203*a* and the rear portion 203*b*, and then an outer wall side portion 203*c* is bent inward perpendicularly to the bottom surface 203*f*. The front side bending portion 212 and the rear side bending portion 233, respectively are previously formed in the inner wall side portions 203*e* and 203*d* and the outer wall side portion 203*c*. Then, as shown in FIG. 7C, the front side bending portion 212 and the rear side bending portion 233, respectively are bent inward to engage the inner wall side portions 203*e* and 203*d* with the outer wall side portion 203*c*. This prevents the assembled lower part 203 from being accidentally developed, and allows the box shape to be maintained. As such, in this embodiment, the front side bending portion 212 and the rear side bending portion 233 have a function of an engaging portion of the lower part 203. Specifically, the front side bending portion 212 has the function of the taking-out preventing structure as described above and also the function of the engaging portion of the lower part 203.

As described above, with the package (packing structure) of the flat display unit according to this embodiment, the lower part 203 has the manual insertion portion 217, thereby allowing the display portion 201 to be easily taken out, and preventing the lower cushioning material 205 from being taken out of the lower part 203 together with the display portion 201, thereby improving workability in taking out the display portion 201.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A package structure with a flat display unit packed therein comprising a packing box and a cushioning material which is placed on a bottom side of the packing box and supports lower left and right ends of the flat display unit packed in the packing box from below, wherein the cushioning material includes a concave contact surface and a manual insertion portion, the concave contact surface contacts a front, rear and bottom surfaces of the flat display unit to hold the flat display unit, the manual insertion portion has a space capable of being inserted therein with a human hand from the rear side of the cushioning material, wherein the manual insertion portion is positioned outer than the concave contact surface and defines a gap between itself and each of the lower left and right end parts of the flat display unit when the flat display unit is set on the cushioning material, wherein the gap includes a first gap portion defined between the lower end of the flat display unit and the bottom surface of the of the cushioning material, and a second gap portion which is continuous with the first gap and defined between the front surface of the flat display unit and the surface of the cushioning material which is opposed to the front surface of the flat display unit, and wherein the first gap is formed downward from a contact plane between the contact surface and the bottom surface of the flat display, and the second gap is formed forward from a contact plane between the contact surface and the front surface of the flat display.

2. The package structure with a flat display unit packed therein according to claim 1, wherein the first gap portion and the second gap portion formed in the cushioning material have a size capable of being inserted therein with a human's hand.

3. The package structure with a flat display unit packed therein according to claim 2, wherein the first gap portion have a size which is greater than that of the second gap portion when the cushioning material is viewed from the rear side thereof when the flat display unit is set on the cushioning material, and the lower left or right side part of the flat display unit is exposed from the cushioning material when the cushioning material is viewed from the rear side thereof when the flat display unit is set on the cushioning material.

4. The package structure with a flat display unit packed therein according to claim 3, wherein the manual insertion portion has a width of 10 to 11 cm when the cushioning material is viewed from the rear side thereof, and in that the first gap has a size of 3 to 4 cm and the second gap has a size of 1.5 to 3 cm when the cushioning material is viewed from the lateral side thereof with the flat display unit being set on the cushioning material.

5. The package structure with a flat display unit packed therein according to claim 4, wherein a pair of first ribs which abut against an inner surface on the front side of the package are provided at left and right ends on the front side of the cushioning material, and a pair of second ribs which abut against an inner surface on the rear side of the package are provided at left and right ends on the rear side of the cushioning material.

6. The package structure with a flat display unit packed therein according to claim 5, wherein the first rib and the second rib are provided on areas other than regions in each of which the gap is provided.

7. The package structure with a flat display unit packed therein according to claim 5, wherein the first rib has a fan shape with a width increasing from the front side toward the rear side when the cushioning material is viewed from above, and the second rib has a fan shape with a width increasing from the rear side toward the front side when the cushioning material is viewed from above.

8. The package structure with a flat display unit packed therein according to claim 5, wherein a reinforcing rib having a smaller size, when the cushioning material is viewed from above, than the first rib is provided between the pair of first ribs.

9. The package structure with a flat display unit packed therein according to claim 5, wherein corner portions of the first and second ribs corresponding to corner portions of the packing box are cut or rounded.

10. The package structure with a flat display unit packed therein according to claim 5, wherein lower corner portions of the first and second ribs are configured so as not to be brought into contact with the corner portions of the packing box.

11. The package structure with a flat display unit packed therein according to claim 2, wherein a first taper is provided in a side wall adjacent to the gap of the cushioning material.

12. The package structure with a flat display unit packed therein according to claim 11, wherein the gap is formed therein with a second taper on the side which is near the lengthwise middle of the packing box.

13. The package structure with a flat display unit packed therein according to claim 2, wherein a bending portion which can be bent inward of the packing box is provided in a side surface of the packing box, a recess in which the bent bending portion is placed is further provided at the corner portion on the front side of the cushioning material so that the recess is caught on the bending portion when the cushioning material is drawn upward from the packing box.

14. A package structure with a flat display unit, comprising:
   a packing box for packing therein a flat display unit; and
   a cushioning material which is placed on a bottom side of the packing box and supports lower left and right ends of the flat display unit from below,
   wherein the cushioning material includes a concave contact surface and a manual insertion portion, where the concave contact surface contacts a front, rear and bottom surfaces of the flat display unit to hold the flat display unit, the manual insertion portion has a space capable of being inserted therein with a human hand from the rear side of the cushioning material,
   wherein the manual insertion portion is positioned outer than the concave contact surface and defines a gap between material itself and each of the lower left and right end parts of the flat display unit when the flat display unit is set on the cushioning material,
   wherein the gap includes a first gap portion defined between the lower end of the flat display unit and the bottom surface of the cushioning material, and a second gap portion, which is continuous with the first gap and defined between the front surface of the flat display unit and the surface of the cushioning material which is opposed to the front surface of the flat display unit, and
   wherein the first gap is formed downward from a contact plane between the concave contact surface and the bottom surface of the flat display, and the second gap is formed forward from a contact plane between the contact surface and the front surface of the flat display.

15. A package structure with a flat display unit packed therein comprising
   a packing box and a cushioning material which is placed on a bottom side of the packing box and supports lower left and right ends of the flat display unit packed in the packing box from below,
   wherein the cushioning material includes a concave contact surface and a manual insertion portion, where the concave contact surface contacts a front, rear and bottom surfaces of the flat display unit to hold the flat display unit, the a manual insertion portion having a space capable of being inserted therein with a human hand from the rear side of the cushioning material,
   wherein the manual insertion portion is positioned outer than the concave contact surface and defines a gap between itself and each of the lower left and right end parts of the flat display unit when the flat display unit is set on the cushioning material,
   wherein the gap includes a first gap portion defined between the lower end of the flat display unit and the bottom surface of the cushioning material, and a second gap portion, which is continuous with the first gap and defined between the front surface of the flat display unit and the surface of the cushioning material which is opposed to the front surface of the flat display unit,
   wherein the first gap is formed downward from a contact plane between the concave contact surface and the bottom surface of the flat display, and the second gap is formed forward from a contact plane between the contact surface and the front surface of the flat display, and
   wherein a bending portion which can be bent inward of the packing box is provided in a side surface of the packing box, a recess is further provided at a corner portion on a front side of the cushioning material, and the bending portion is bent into a space in the recess.

16. The package structure with a flat display unit packed therein according to claim 15, wherein the recess is caught on the bending portion when the cushioning material is drawn upward from the packing box.

* * * * *